UNITED STATES PATENT OFFICE.

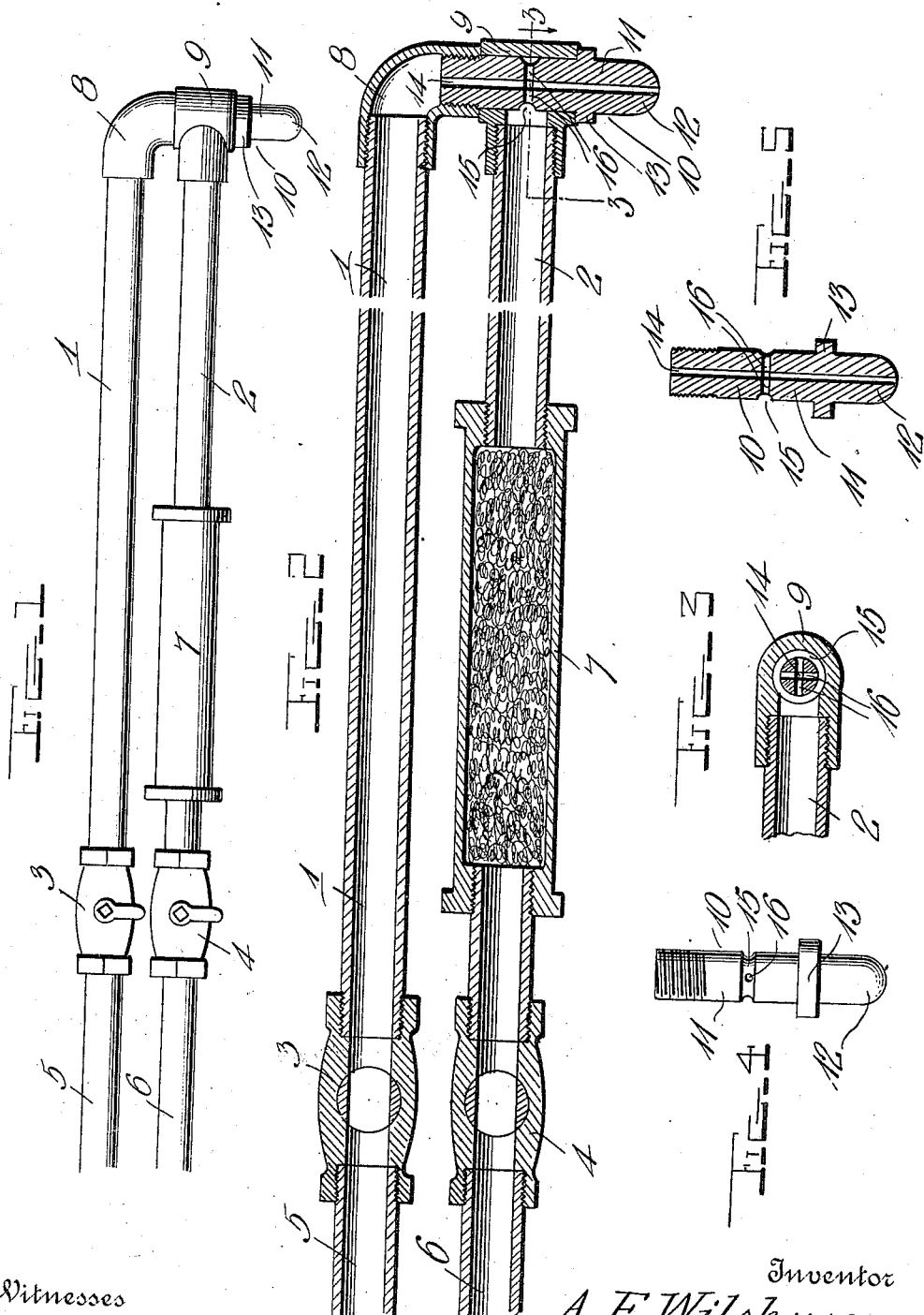

AUGUST E. WILSHUSEN, OF STAFFORD, KANSAS, ASSIGNOR TO H. D. PROSE AND W. W. JENNINGS.

BURNER FOR WELDING-MACHINES.

1,006,890.  Specification of Letters Patent.  Patented Oct. 24, 1911.

Application filed December 15, 1910. Serial No. 597,391.

*To all whom it may concern:*

Be it known that I, AUGUST E. WILSHUSEN, a citizen of the United States, residing at Stafford, in the county of Stafford and State of Kansas, have invented certain new and useful Improvements in Burners for Welding-Machines; and I do declare the following to be a full, clear, and exact description of the invention, such as will enable others skilled in the art to which it appertains to make and use the same.

This invention relates to improvements in burners or torches for welding machines.

One object of the invention is to provide a burner or torch of this character having an improved construction of tip whereby the gases passing through the burner will be effectually mixed before being ignited.

Another object is to provide a torch or burner having arranged in one branch thereof a filtering chamber by means of which the gas passing therethrough will be purified.

With these and other objects in view, the invention consists of certain novel features of construction combination and arrangement of parts as will be more fully described and particularly pointed out in the appended claims.

In the accompanying drawings: Figure 1 is a side view of my improved burner; Fig. 2 is a longitudinal sectional view thereof; Fig. 3 is a cross section through the tip end of the burner on the line 3—3 of Fig. 2; Fig. 4 is an enlarged detail side view of the tip removed from the burner; Fig. 5 is an enlarged longitudinal sectional view of the tip.

My improved torch or burner is especially adapted for mixing and burning acetylene and oxygen gas whereby an intensely hot flame is produced which may be effectually employed in connection with the welding or fusing of metals.

The burner comprises an oxygen conducting pipe 1 and an acetylene gas conducting pipe 2. The pipes 1 and 2 may be of any suitable size and length and are disposed in parallel relation as shown. On the inner ends of the pipes are arranged cut-off valves 3 and 4 to which are connected the oxygen and gas supply pipes 5 and 6 leading to the gas and oxygen generators or supply tanks. At a suitable position in the gas conducting pipes 2 is arranged a gas filtering device comprising a tube 7 of larger diameter than the pipe 2 and having interiorly threaded ends into which are screwed the sections of the pipe 2 as shown. The filtering tube 7 is adapted to be filled with cotton or other suitable substance which serves as a filtering medium.

On the outer end of the oxygen conducting tube 1 is arranged an elbow 8 while on the outer end of the gas conducting tube 2 is arranged a T-coupling 9. Arranged in the transverse passage of the T-coupling 9 is a gas and oxygen mixing plug 10, said plug comprising a cylindrical body 11 having a threaded inner end and a rounded outer end or tip 12. On the cylindrical body portion 11 of the plug near the tip end thereof is formed an annular stop flange 13. In arranging the plug in operative position the cylindrical body portion thereof is inserted through the transverse passage of the T coupling 9 and the threaded inner end of the plug screwed into engagement with the adjacent end of the elbow 8 on the oxygen conducting pipe 1. When the plug is thus arranged and screwed into engagement with the elbow 8 the stop flange 13 will be drawn into gas tight engagement with the adjacent end of the T-coupling as clearly shown in Fig. 2 of the drawing.

Formed through the plug 10 is a central longitudinally disposed gas conducting and mixing passage 14. In the cylindrical body portion 11 of the plug at a point opposite the outer end of the gas conducting pipe 2 is formed an annular groove or channel 15 which is connected to the central passage 14 by a series of diametrically arranged passages 16 through which the gas from the pipe 2 passes and enters the central passage 14 in the plug through which the oxygen is rapidly passing, said acetylene thus mixing with the oxygen in the outer portion of the plug and tip and forming a perfectly combustible gas which when ignited will provide an intensely hot flame which may be used for the purpose herein specified or for any other purpose. By constructing the torch or burner in the manner described the same may be readily employed for use in connection with welding broken cylinders or other tubular or hollow bodies and by the use of the same any metal which is capable of being fused may be welded together.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a gas mixing burner of the character described, a plurality of gas conducting pipes, cut off valves on one end of said pipes, a gas filtering device arranged in one of the pipes, a T-coupling arranged on the outer end of said pipe, an elbow arranged on the outer end of the other pipe, a gas mixing plug arranged in said T-coupling and having a threaded engagement with said elbow whereby the outer ends of said pipes are connected together, said plug having on its outer end a tip and having formed therethrough a central longitudinally disposed gas conducting and mixing passage communicating with one of said pipes and a series of transverse radially disposed passages intersecting said central passage and communicating with the other pipe whereby the gas from said pipes will pass through and mix in said passages before reaching the end of the tip.

2. In a burner of the character described, a plurality of gas conducting pipes, a T-coupling on the outer end of one of said pipes, an elbow arranged on the adjacent end of the other pipe, a gas mixing plug comprising a cylindrical body portion having a threaded inner end and an annular groove, an annular shoulder formed on said body portion, a tip formed on the outer end thereof, said tip and body portion having formed therethrough a central longitudinally disposed gas mixing passage, and a series of transverse radially disposed passages to connect said groove with said central mixing passage whereby when said plug is arranged in the T-coupling of one of said pipes and has its inner end screwed into engagement with the elbow on the opposite pipe, said pipes will be connected together and connected with the passages in the plug whereby the gas passing through the pipe will enter and mix in the passages before being discharged from the tip of the plug.

In testimony whereof I have hereunto set my hand in presence of two subscribing witnesses.

AUGUST E. WILSHUSEN.

Witnesses:
WILLIAM C. KIRKPATRICK,
BENJAMAN F. CLARK.

Copies of this patent may be obtained for five cents each, by addressing the "Commissioner of Patents, Washington, D. C."